United States Patent [19]
Hasegawa et al.

[11] Patent Number: 5,575,544
[45] Date of Patent: Nov. 19, 1996

[54] VEHICLE-MOUNTED EQUIPMENT ANTI-THEFT MECHANISM

[75] Inventors: Masakazu Hasegawa; Tomoji Yoshida; Takeshi Baba, all of Tokyo, Japan

[73] Assignee: Clarion Co., Ltd., Tokyo, Japan

[21] Appl. No.: 112,119

[22] Filed: Aug. 26, 1993

[30] Foreign Application Priority Data

Aug. 26, 1992 [JP] Japan .................... 4-060122 U
Sep. 4, 1992 [JP] Japan .................... 4-062414 U
Dec. 8, 1992 [JP] Japan .................... 4-328215
Feb. 26, 1993 [JP] Japan .................... 5-038931 U

[51] Int. Cl.$^6$ .................................................. A47B 81/06
[52] U.S. Cl. .................... 312/7.1; 439/153; 455/349
[58] Field of Search .................... 312/265.6, 223.1, 312/7.1, 222; 439/131, 152–159; 455/349

[56] References Cited

U.S. PATENT DOCUMENTS 4,940,414  7/1990  Lee .

FOREIGN PATENT DOCUMENTS 4008536  10/1990  Germany .
4035551  5/1991  Germany .
4118296  12/1991  Germany .
4243726  7/1993  Germany .
58-176204  11/1983  Japan .

Primary Examiner—Peter M. Cuomo
Assistant Examiner—Gerald A. Anderson
Attorney, Agent, or Firm—Koda and Androlia

[57] ABSTRACT

An anti-theft apparatus for use in a vehicle-mounted electronic component includes a removable control panel. Protrusions on a first side of the control panel engage holes in a first side of an equipment body of the electronic component and function as hinges as the control panel is rotated to a mounted position. A first electrical connector on the equipment body engages a second electrical connector on a rear surface of the control panel and a biasing member exerts a force against the rear surface of the control panel. The control panel includes a recess in a second side into which a locking protrusion of a locking mechanism in the equipment body extends. A button actuates the locking mechanism retracting the locking protrusion and allowing the biasing member to eject the control panel from the equipment body. The locking protrusion is retracted by a sliding cam or directly by depression of the button. Another embodiment includes a concavity in the control panel which engages a deflectable protrusion on the equipment body after the release button is depressed so as to retain the control panel in an ejected position for removal by the user. Elastic members engage the protrusions of the control panel providing a click feel during removal and retain the control panel in the ejected position. Another embodiment includes an elastic protrusion in the equipment body which engages a corresponding concavity in the front panel to retain the front panel in an ejection position.

4 Claims, 20 Drawing Sheets

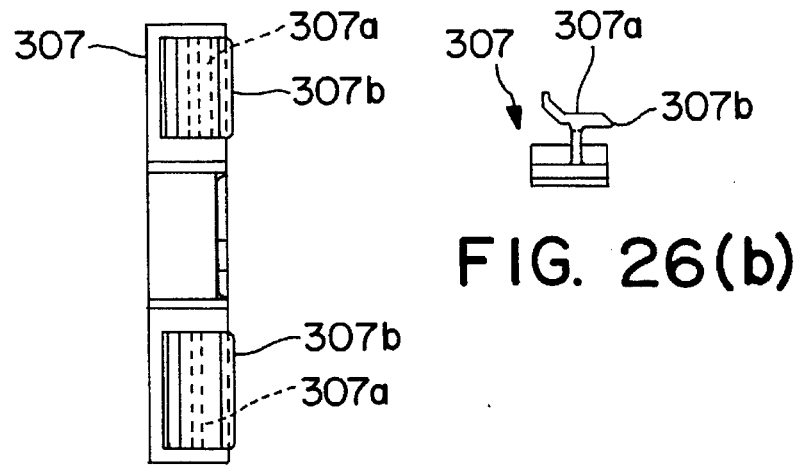
FIG. 26(b)
FIG. 26(a)
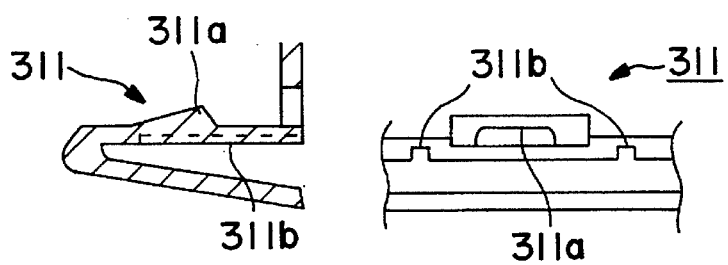
FIG. 27(a)   FIG. 27(b)
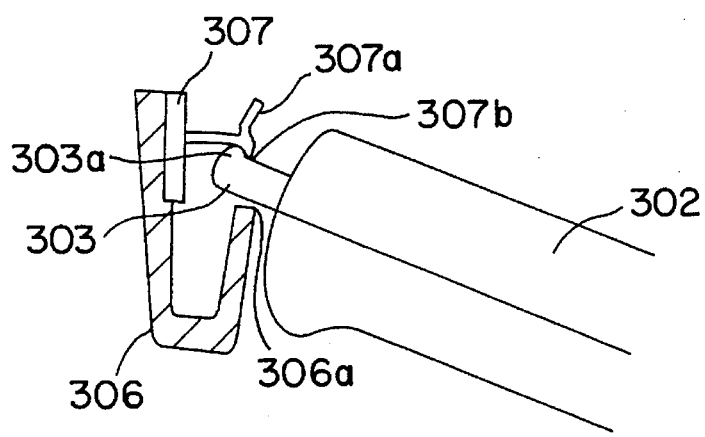
FIG. 28

VEHICLE-MOUNTED EQUIPMENT ANTI-THEFT MECHANISM

BACKGROUND OF THE INVENTION

The present invention relates to a vehicle-mounted electronic apparatus with an anti-theft device, and more particularly, to a vehicle-mounted electronic apparatus having a removable control panel with a mechanism providing for simple and secure attachment and removal.

Prior art devices include vehicle-mounted electronic components having anti-theft mechanisms which allow the entire electronic component to be removed from the vehicle when the operator leaves the vehicle unattended, thus eliminating the possibility of theft. However, the electronic components are often heavy, bulky, and otherwise inconvenient for one to carry. The user is thus inclined to neglect to remove the electronic component and the utility of the anti-theft mechanism is diminished.

Additionally, electronic components which include high power audio devices generally have a high-output amplifier for the production of a high fidelity sound. Such amplifiers generate a significant amount of heat after extended periods of use. Heat build-up in the amplifiers makes the electronic components too hot for a user to comfortably handle. Therefore, the user is further discourage from using the anti-theft mechanism.

To overcome the above drawbacks, a vehicle-mounted electronic component incorporating an anti-theft mechanism having a control panel which is removable from a equipment body of the electronic component has been introduced. The control panel includes control buttons and switches therefore allowing operation of the equipment body only when the control panel is connected. The user merely disconnects the control panel and carries it away when the vehicle is unattended. Theft of the equipment body is discouraged because the equipment is rendered inoperative by the removal of the control panel. Use of the anti-theft device is more convenient then removal of an entire component because the control panel is relatively compact and not prone to heat build-up. Such convenience results in more consistent use of the anti-theft device, even during periods of short duration, and theft is reduced accordingly. The above advantages have resulted in such anti-theft mechanisms being used in a wide variety of products of varying dimensions and shapes.

However, removable control panels of the prior art are unnecessarily large. Such control panels are designed to prevent slippage during attachment and removal operations and to prevent vibration induced detachment during excursions over rough terrain. The achievement of such design goals has resulted in control panels having a size and weight greater than necessary. Such control panels often incorporate large and complex locking mechanisms. The resultant size and weight inconveniences the user, thereby discouraging use of the mechanism. Furthermore, the size and complexity of the control panel and the locking mechanism increases production costs.

OBJECTS AND SUMMARY OF THE INVENTION

Accordingly, it is an object of the invention to provide an apparatus with anti-theft mechanism in a vehicle-mounted electronic equipment which overcomes the drawbacks of the prior art.

It is a further object of the invention to provide a compact and light-weight mechanism for locking and unlocking a control panel.

It is a still further object of the invention to provide the locking mechanism capable of tightly fixing the control panel to an equipment body.

It is another object of the invention to provide an apparatus with a removable control panel that is moved to a predetermined ejected position during a removal operation permitting a user to easily grasp the control panel.

Briefly stated, the present invention provides an anti-theft apparatus for use in a vehicle-mounted electronic component including a removable control panel. Protrusions on a first side of the control panel engage holes in a first side of an equipment body of the electronic component and function as hinges as the control panel is rotated to a mounted position. A first electrical connector on the equipment body engages a second electrical connector on a rear surface of the control panel and a biasing member exerts a force against the rear surface of the control panel. The control panel includes a recess in a second side into which a locking protrusion of a locking mechanism in the equipment body extends. A button actuates the locking mechanism retracting the locking protrusion and allowing the biasing member to eject the control panel from the equipment body. The locking protrusion is retracted by a sliding cam or directly by depression of the button. Another embodiment includes a concavity in the control panel which engages a deflectable protrusion on the equipment body after the release button is depressed so as to retain the control panel in an ejected position for removal by the user. Elastic members engage the protrusions of the control panel providing a click feel during removal. Another embodiment includes an elastic protrusion in the equipment body which engages a corresponding concavity in the front panel to retain the front panel in an ejection position.

According to an embodiment of the invention, there is provided an anti-theft mechanism in a vehicle-mounted electronic apparatus comprising: an equipment body, a control panel, engaging means for disengagably engaging the control panel to the equipment body, locking means for unlockably locking the control panel to the equipment body in a mounted position, biasing means for continuously biasing the control panel away from the equipment body, and retaining means for holding the control panel in an ejected position.

According to a feature of the invention, there is provided an anti-theft mechanism in a vehicle-mounted electronic apparatus comprising: an equipment body, a control panel, the control panel including means for operating the electronic apparatus, the equipment body including a first engaging portion, the control panel including a second engaging portion, the first engaging portion having one of a convex shape and a concave shape, the second engaging portion having another one of a convex shape and a concave shape, the first engaging portion engaging the second engaging portion, the equipment body including a first locking portion, the control panel including a second locking portion, the first locking portion having one of a convex shape and a concave shape, the second locking portion having another one of a convex shape and a concave shape, the first locking portion interlocking with the second locking portion so as to maintain the control panel in a mounted position, means for disengaging the second locking portion from the first locking portion including a release button slidable in a direction parallel to a front of the equipment body, biasing means for continuously biasing the control panel away from the equipment body, and retaining means for holding the control panel in an ejected position further from the equipment body than the mounted position.

According to a further feature of the invention, there is provided an anti-theft mechanism in a vehicle-mounted electronic apparatus comprising: an equipment body, a control panel, the control panel including means for operating the electronic apparatus, the equipment body including a first engaging portion, the control panel including a second engaging portion, the first engaging portion has one of a convex shape and a concave shape, the second engaging portion has another one of a convex shape and a concave shape, the first engaging portion engaging the second engaging portion, the equipment body including a first locking portion, the control panel including a second locking portion, the first locking portion having one of a convex shape and a concave shape, the second locking portion having another one of a convex shape and a concave shape, the first locking portion interlocking with the second locking portion, a release means for disengaging the first locking portion from the second locking portion, biasing means for biasing the control panel away from the equipment body, retaining means for retaining the control panel at an ejected position after operation of the release means, the retaining means including a first stopper and a second stopper, the equipment body including the first stopper, the control panel including the second stopper, and the first stopper and the second stopper being capable of contacting each other.

According to a still further feature of the invention, there is provided an anti-theft mechanism in a vehicle-mounted electronic apparatus comprising: an equipment body, a control panel, a frame, the equipment body including the frame, the control panel including means for operating the electronic apparatus, the frame including a first engaging portion, the control panel including a second engaging portion, the first engaging portion has one of a convex shape and a concave shape, the second engaging portion has another one of a convex shape and a concave shape, the first engaging portion engaging the second engaging portion, the frame including a first locking portion, the control panel including a second locking portion, the first locking portion having one of a convex shape and a concave shape, the second locking portion having another one of a convex shape and a concave shape, the first locking portion interlocking with the second locking portion, a release means for disengaging the first locking portion from the second locking portion, and biasing means for biasing the control panel away from the equipment body.

According to another feature of the invention, there is provided an anti-theft mechanism for an electronic apparatus mounted in a vehicle comprising: an equipment body of the electronic apparatus, the equipment body being mounted within the vehicle, a control panel, engaging means for removably coupling the control panel to the equipment body, locking means for locking the control panel in a mounted position upon the equipment body, the locking means including a control means for unlocking, biasing means for biasing the control panel away from the equipment body, and retaining means for holding the control panel in an ejected position after actuation of the control means.

According to a still another feature of the invention, there is provided an anti-theft mechanism for an electronic apparatus mounted in a vehicle comprising: an equipment body of the electronic apparatus, the equipment body being mounted within the vehicle, a control panel, engaging means for removably coupling the control panel to the equipment body, locking means for locking the control panel in a mounted position upon the equipment body, the locking means including a first locking portion and a second locking portion, the first locking portion being attached to one of the equipment body and the control panel, the second locking portion being attached to another one of the equipment body and the control panel, the first locking portion interlocking with the second locking portion, the locking means including a button slidable parallel to a front of the equipment body, means for biasing the first locking portion toward the second locking portion, the locking means having a tapered cam portion, moved by the button, deflecting the first locking portion such that the first locking portion is unlocked from the second locking portion.

The above and other objects and advantages of the present invention will become apparent from the following description read in conjunction with the accompanying drawings, in which like reference numerals designate the same element.

BRIEF DESCRIPTION OF THE DRAWINGS

FIG. 26(a) is a front view of an elastic stopper of FIG. 25.

FIG. 26(b) is a plan view of the elastic stopper of FIG. 25.

FIG. 27(a) is a cross sectional view of a male connector of FIG. 24.

FIG. 27(b) is a front view of the male connector of FIG. 24.

FIG. 28 is a schematic view to show the connection of the control panel and the pair of holes when the control panel stays at an ejected position.

DETAILED DESCRIPTION OF THE PREFERRED EMBODIMENT

Figure 1:
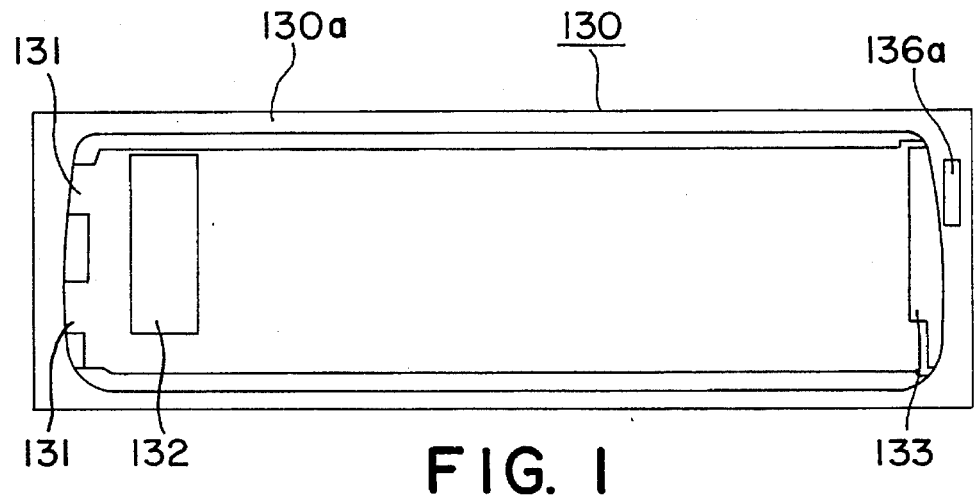
FIG. 1 is a front view of an equipment body in a first embodiment of the present invention.

Referring FIG. 1—1, a first embodiment of the present invention includes an equipment body 130 having a substantially rectangular front 130a with an aspect ratio of about 1:3. A pair of concavities 131 are located at a left side of front 130a. A male connector 132, including a shielding plate and a spring (both are not shown), is located to the right of concavities 131. Equipment body 130 also includes a locking mechanism 133 and a release button 136a at the right side of front 130a.

Figure 2:
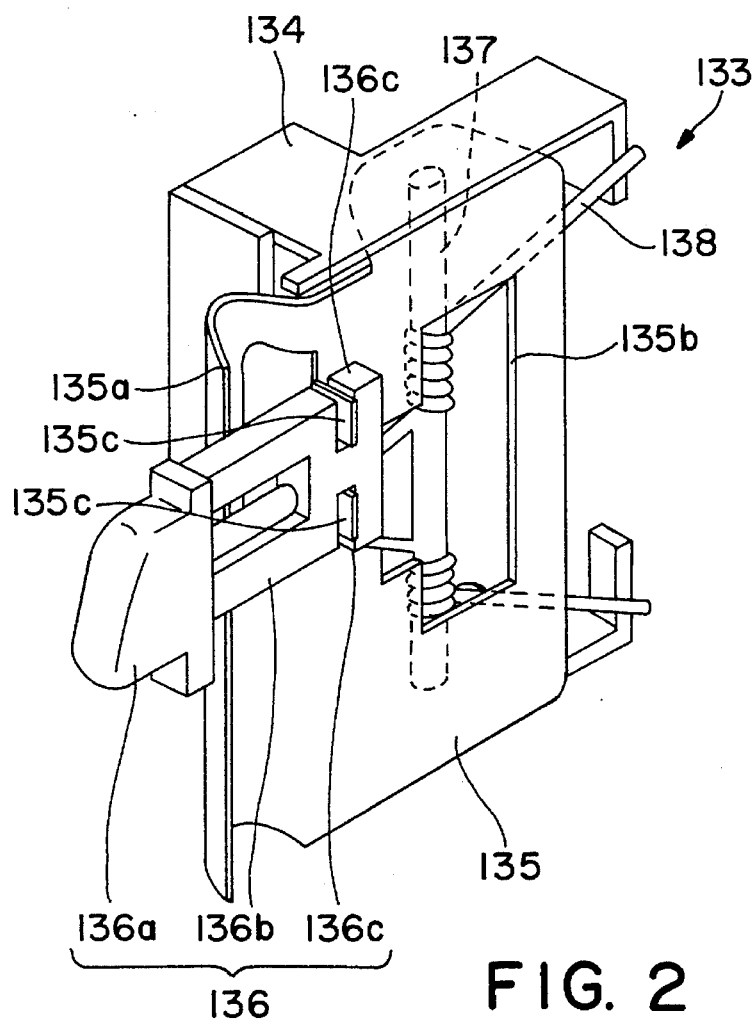
FIG. 2 is a schematic view showing a locking mechanism of FIG. 1.
Figure 3:
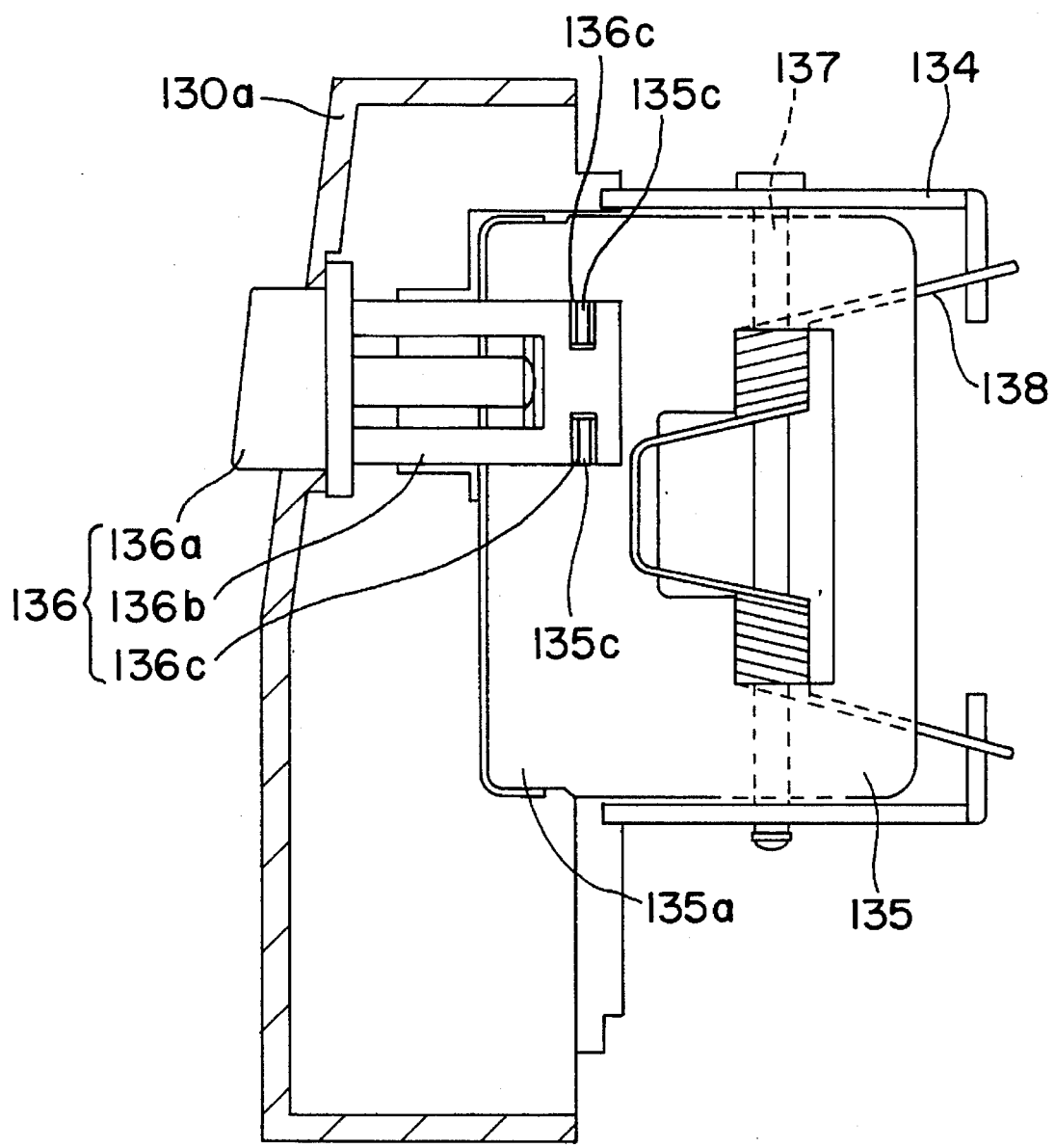
FIG. 3 is a cross sectional view of the locking mechanism of FIG. 2.

Referring now to FIGS. 1-2 and 1-3, locking mechanism 133 includes a base 134, a locking member 135, a release member 136, a shaft 137 and a coil spring 138. Base 134 is fixed upon front 130a of equipment body 130. Locking member 135 is biased against base 134 by coil spring 138 which is rotatably mounted around shaft 137. One side of coil spring 138 extends through a rectangular hole 135b of locking member 135. Two ends of coil spring 138 rest upon an edge of base 134 and the one side of coil spring 138 presses against locking member 135 biasing it in a left-hand direction. A V-shape cross sectional portion 135a of locking member 135 serves as a stopper. Release member 136 includes release button 136a, a body portion 136b and grooves 136c. Tabs 135c, of locking member 135, engage grooves 136c, thereby moving the release member 135 when release button 136a is depressed.

Referring now to FIGS. 1-4 and 1-5, a control panel 140 has substantially the same dimension as front 130a of equipment body 130. The control panel 140 includes a plurality of function buttons (not shown) on a front surface, which are required for operating the electronic component, for example, a CD player. Protrusions 141 are located at a left end of control panel 140. A female connector 142 is disposed on a rear surface of control panel 140. Protrusions 141 and female connector 142 engage concavities 131 and male connector 132 of equipment body 130, respectively, shown in FIG. 1—1. The control panel 140 further includes an extended recess 143 for accepting V-shape portion 135a of locking mechanism 133 shown in FIG. 1-2.

Referring to FIG. 1-6, control panel 140 is coupled to equipment body 130 by concavities 131 and protrusions 141 at the left side of front 130a, V-shape portion 135a and extended recess 143 at a right side, and male connector 132 and female connector 142. Control panel 140 is partially rotatable upon protrusions 141 at the left end of control panel 130. The control panel 140 is locked in place by the connection of extended recess 143 and V-shape portion 135a. When control panel 140 is attached to equipment body 130, control panel 140 is biased against front 130a by V-shape portion 135a of locking mechanism 133.

Referring now to FIGS. 1-7 and 1-8, when control panel 140 is pushed toward equipment body 130, V-shape portion 135a deflects over a rear edge of control panel 140 and meets extended recess 143. Since locking member 135 is biased towards the left by coil spring 138, V-shape portion 135a of locking member 135 engages extended recess 143 of control panel 140 thereby locking control panel 140 into place.

Referring now to FIGS. 1-9 and 1-10, a biasing member 139 having a spring (not shown) is disposed rotatably around male connector 132 at front 130a of equipment body 130. When control panel 140 is pressed toward equipment body 130, the biasing member 139 provides a resilient force against control panel 140. Securing control panel 140 in place forces biasing member 139 into a recess in which male connector 132 is located. The outward force of the bias member 139 reduces play between control panel 140 and equipment body 130 so as to produce a secure connection between male connector 132 and female connector 142.

Returning now to FIG. 1-7, release button 136a of release member 136 is depressed when control panel 140 is removed from equipment body 130. Depression of release button 136a urges tabs 135c toward equipment body 130 and causes V-shape portion 135a to retract from extended recess 143, allowing control panel 140 to be removed.

Returning now to FIG. 1-6, as described the above, biasing member 139 exerts an outward force upon control panel 140. However, protrusions 141 of control panel 140 are coupled rotatably to concavities 131 of equipment body 130, thereby serving to hinge movement of control panel 140 such that when release button 136a is depressed, biasing member 139 rotates control panel 140 outward around a left edge of front 130a. Finally, female connector 142 disengages male connector 132, protrusions 141 exit concavities 131, and control panel 140 is completely removed from equipment body 130. Thus, the user need not apply substantial force to unlock control panel 140, and a potential of damage occurring to a locking mechanism or an electrical connector during removal of control panel 140 is reduced.

The locking mechanism is compact and simple, thereby promising high productivity and cost reduction.

Referring now to FIG. 1–11, a modification of the first embodiment includes a locking member 135' and an extended convexity 143'. Locking member 135' is formed from a leaf spring. When control panel 140 closes, a V-shape portion 135a' of locking member 135' rides over extended convexity 143' which then engages V-shaped portion 135a', locking control panel 140 in place. When removing control panel 140, release button 136a is depressed, deflecting locking member 135' and moving V-shape portion 135a' clear of extended convexity 143'. Control panel 140 is then ejected outward by biasing member 139 at the left side of equipment body 130 as shown in FIG. 1–6. The omission of coil spring 138 in the embodiment simplifies the overall structure and reduces the production cost.

Referring now to FIG. 2-1, another embodiment of the present invention includes an equipment body 204, a control panel 205, and a frame 206. Frame 206 extends along a front edge of equipment body 204. Control panel 205 has a plurality of interface devices such as buttons and a display. Control panel 205 is removably connected to a front surface of equipment body 204 in frame 206.

Referring to FIG. 2—2, a first connector 224, of equipment body 204, engages a second connector 225 of control panel 205. Control panel 205 includes a first protrusion 207a coupling with a concavity 209 at a left side of frame 206, and a second protrusion 207b coupling with concavity 208 at a right side of frame 206. A bias mechanism 226 is comprised of a pivot plate 227 and a spring (not shown). Pivot plate 227 surrounds first connector 224. A locking mechanism 210 includes a bracket 211, a locking plate 212, a coil spring 213 and a shaft 214 arranged at the right side of frame 206.

Referring now to FIG. 2–3, bracket 211 includes a first plate 211a and a pair of second plates 211b at ends of first plate 211a. Second plates 211b include a pair of vertical holes 211c. First plate 211a has a pair of horizontal holes 211d and tabs 211e. Locking plate 212 has a pair of vertical through-holes 212a, a contact portion 212b and a pair of locking portions 216 each consisting of a tapered end 216a, a locking claw 216b and a locking concavity 216c.

Referring now to FIGS. 2–4, 2–5, 2–6, 2–7, 2–8 and 2–9, a release member 230, including a release button 218 and a slide plate 219, releases locking mechanism 210. Release button 218 is attached movably upward and downward at the right side of frame 206. Locking plate 212 is supported by bracket 211 such that an upper edge and a lower edge of locking plate 212 are engaged with second plates 211b. Through-holes 212a of locking plate 212 are coupled to vertical fixing holes 211c of bracket 211 by shaft 214 rotatably supporting locking plate 212.

Shaft 214 holds coil spring 213 so it can rotate in a clockwise direction. Movement of a first end coil spring 213 is prevented by first plate 211a while a second end of coil spring exerts a clock-wise pressure upon locking plate 212 whose movement is restricted by contact portion 212b coming into contact with tabs 211e. A keeper washer 215 is attached to a bottom of shaft 214, thereby fixing locking plate 212 to bracket 211.

Slide plate 219 is disposed at a rear of release button 218 and has a shaft portion 219a attached to release button 218. Shaft portion 219a is inserted into a slot 206a of frame 206, thereby enabling slide plate 219 to move up and down along slot 206a. A spring 221, located between slide plate 219 and frame 206, biases slide plate 219 in a downward direction. A contact portion 222, formed along an upper edge of slide plate 219, engages a protruding portion 217 extending from one of locking portions 216. Tapered portion 220, of slide plate 219, continues below contact portion 222 allowing slide plate 219 to function as a cam deflecting locking portions 216 when release button 218 is moved in an upward direction. A pair of fasteners 223 are inserted through horizontal fixing holes 211d.

Referring now to FIGS. 2–10, 2–11, and 2–12, pivot plate 227 having a spring (not shown) is disposed rotatably at the front surface of equipment body 230, encompassing connector 224. When control panel 205 is mounted to equipment body 204, first protrusion 207a of control panel 205 is inserted into concavity 209 at the left side of equipment body 204. Pivot plate 227 exerts a positive bias against control panel 205 as it is moved towards equipment body 204. Second protrusion 207b deflects tapered end 216a of locking portions 216 towards the right against the bias of coil spring 213. Further pressure upon control panel 205 in a mounting direction overcomes the bias of coil spring 213b causing second protrusion 207b to slide over locking claws 216b of locking portions 216. Second protrusion 207b engages locking concavity 216c while urging pivot plate 227 into the recess in which connector 224 is located. As a result, first connector 224 is connected to second connector 225.

The method of operation is reversed when the control panel 205 is removed. The user moves release button 218 upward, against the bias of spring 221, in order to disengage control panel 205 from equipment body 204. Tapered end 220 of slide plate 219 pushes protruding portion 217 of locking portions 216 to the right as shaft portion 219a travels in slot 206a. Locking plate 212 rotates around shaft 214 in a counterclockwise direction against the force of coil spring 213. Locking concavities 216c are thus moved clear of second protrusion 207b. The user can then easily remove control panel 205 since control panel 205 is biased to rotate outward by pivot plate 227 of equipment body 204. Locking mechanism 210 returns to in initial location upon a release of release button 218.

As described above, in the present invention the incorporation of locking mechanism 210 into frame 206 of equipment body 204 makes control panel 205 compact and light. Furthermore, it is possible to reduce production costs and to increase a portability. Moreover, concavity 208 and protrusions 207a and 207b securely fasten control panel 205 to equipment body 204 eliminating vibration induced release of control panel 205.

Referring now to FIG. 3-1, another embodiment of the present invention includes an equipment body 301, which is mounted in a vehicle, and a detachable a control panel 302. Control panel 302 includes protrusions 303 at a left side thereof, a pair of recesses 304 at a right side thereof, and a concavity 305. Equipment body 301 has holes 306a in a frame 306 at a left side thereof, a stopper 307 adjacent to holes 306a, a pair of locking portions 308, and a release button 309 at a right side. A stopper 311 is at a lower edge of frame 306. Locking portion 308 has a pair of locking protrusions and is fixed inside at the right side of frame 306 by fasteners (not shown.) Release button 309 belongs to a lock release mechanism (not shown) mounted inside equipment body 301 at the right side. The lock release mechanism permits locking protrusions of locking portion 308 to be retracted from recesses 304, of control panel 302, by pushing release button 309. A socket 310, disposed at the left side of frame 306, electrically connects control panel 302 to equipment body 301. A bias plate 310a exerts an outward pressure against a rear surface of control panel 302.

Referring now to FIG. 3-2, protrusions 303 of control panel 302 are inserted into holes 306a of frame 306. Frame 306 has stopper 307, which is formed from an elastic material, situated behind holes 306a. Protrusions 303 include hooks 3–3a which engage stopping portions 307a.

Referring to FIGS. 3–3a and 3–3b, stopping portions 307a have a T-like shape and include front ends 307b, which make contact with hooks 303a of protrusions 303 of control panel 302.

Referring now to FIGS. 3–4a and 3–4b, stopper 311 includes a stopping protrusion 311a and a pair of recessed portions 311b. Stopping protrusion 311a engages concavity 305 when control panel 302 is inserted into a predetermined position by rotating control panel 302 toward equipment body 301 while hinging upon protrusions 303. When control panel 302 moves further toward equipment body 301, stopping protrusion 311a passes over concavity 305.

Figure 4:
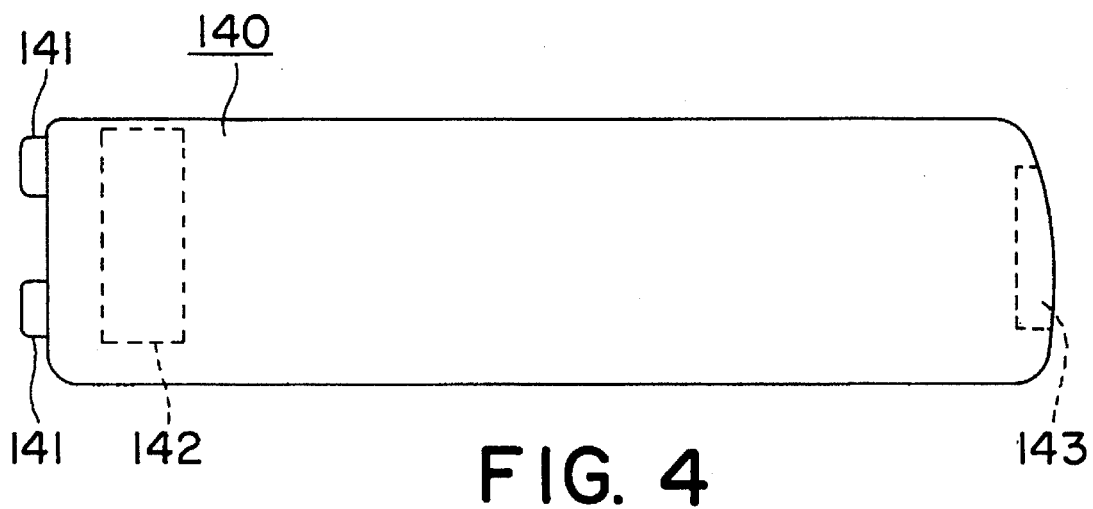
FIG. 4 is a front view of a control panel in the first embodiment of the present invention.
Figure 5:
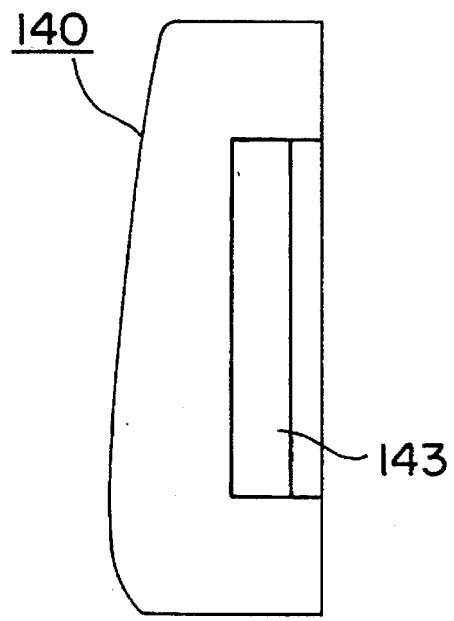
FIG. 5 is a side view of the control panel of FIG. 4.
Figure 6:
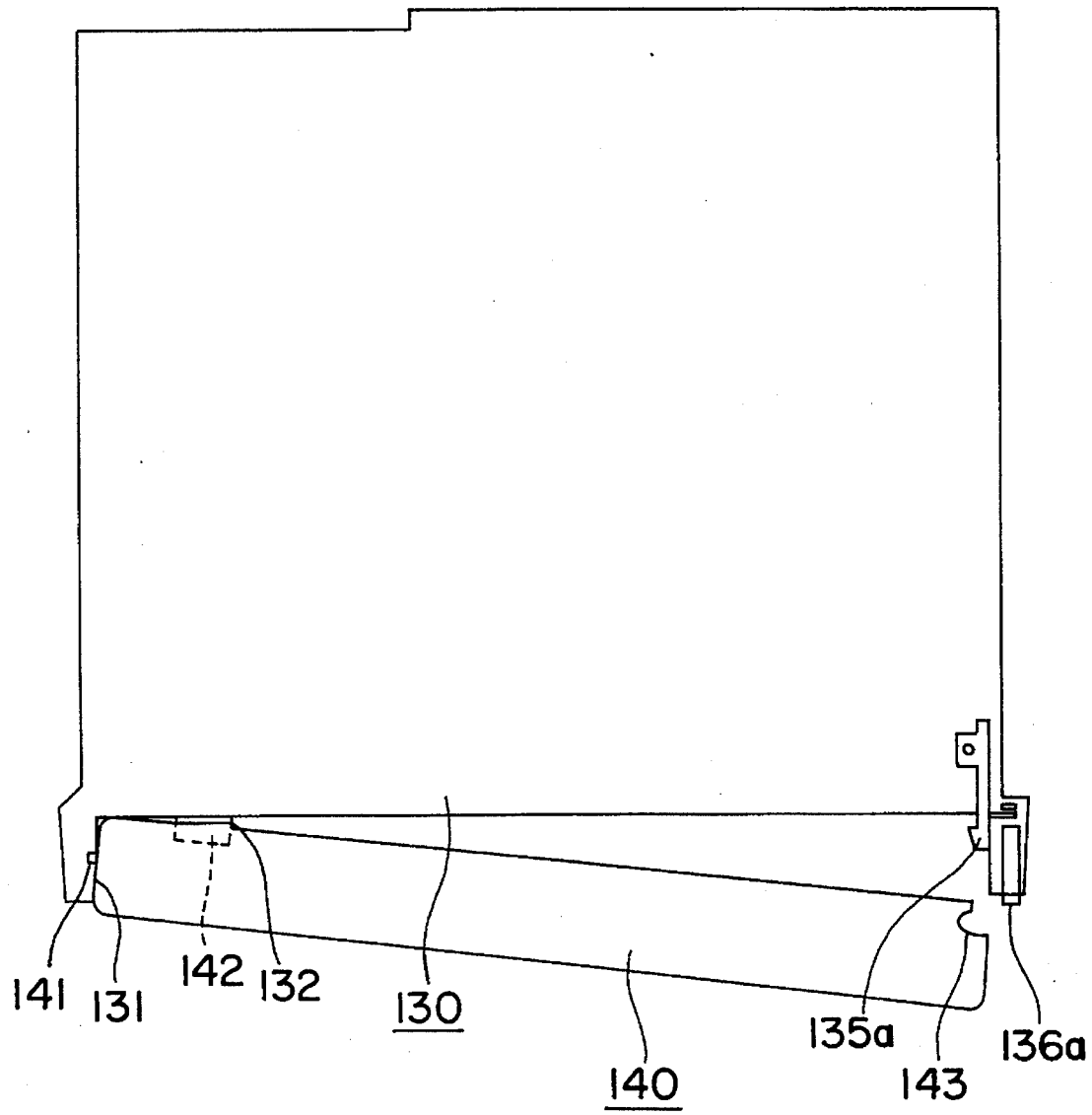
FIG. 6 is a plan view showing the control panel unlocked from thee equipment body in the first embodiment of the present invention.
Figure 7:
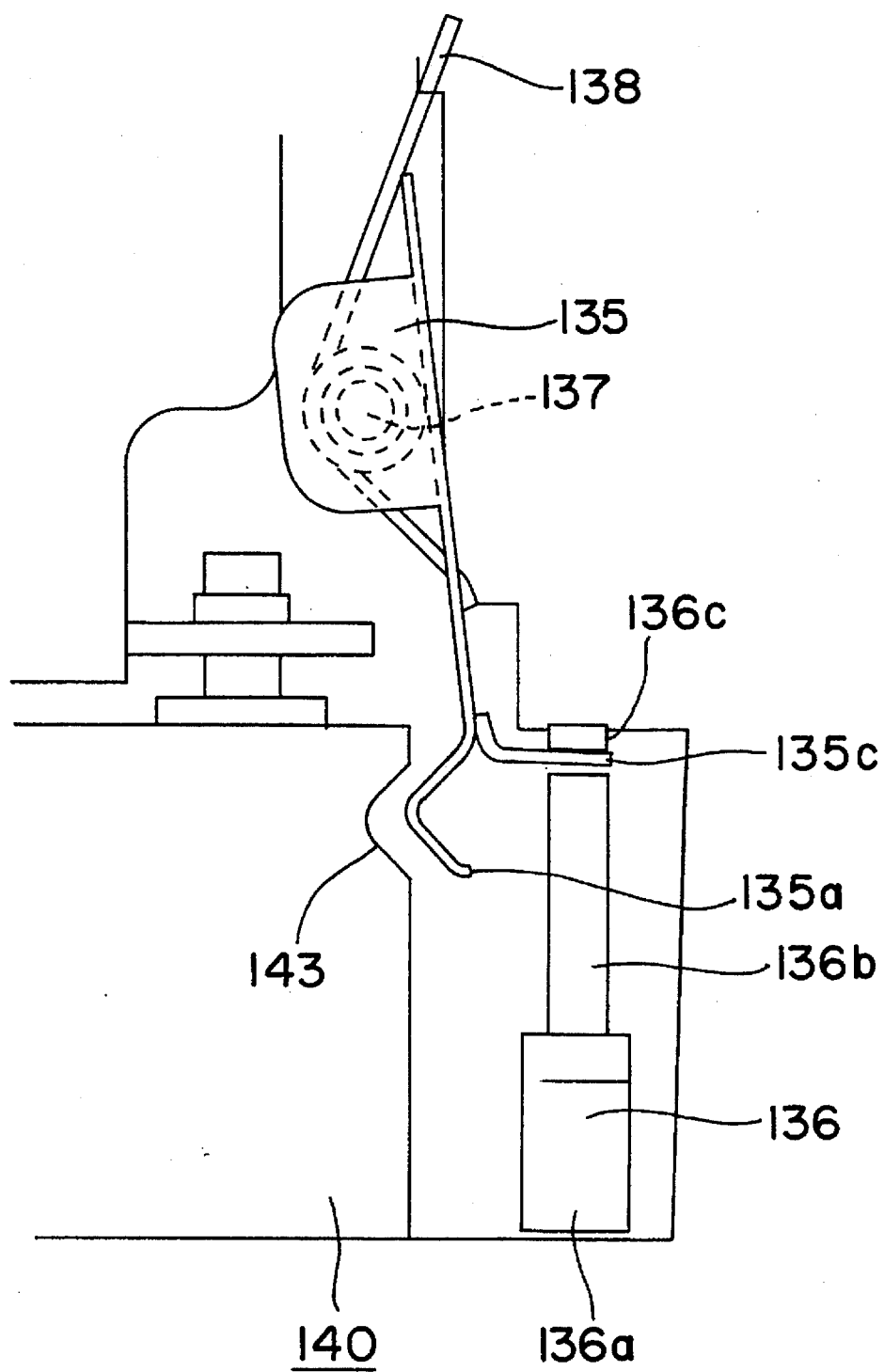
FIG. 7 is a cross sectional view showing the locking mechanism of FIG. 3.
Figure 8:
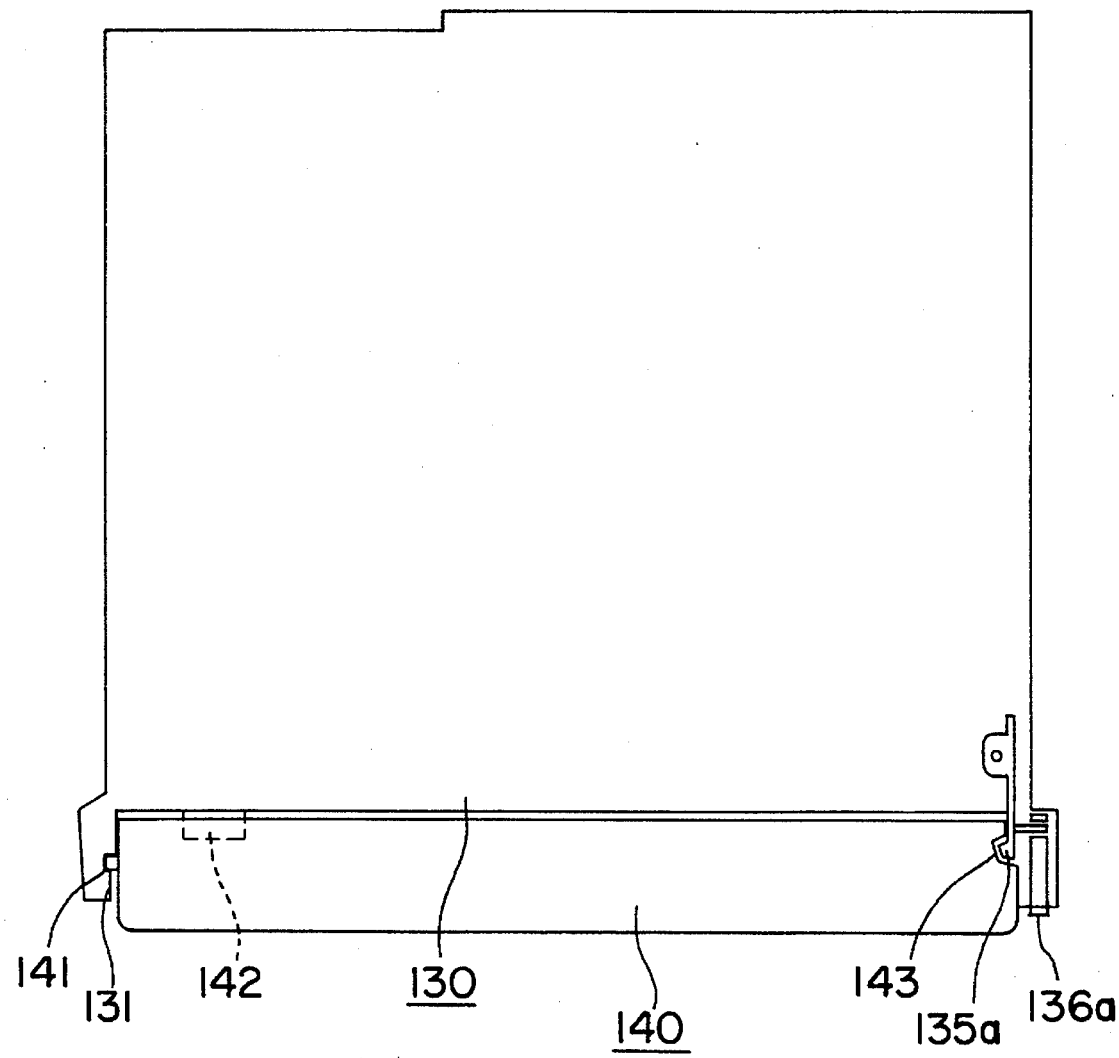
FIG. 8 is a plan view showing the control panel locked to the equipment body of FIG. 6.
Figure 9:
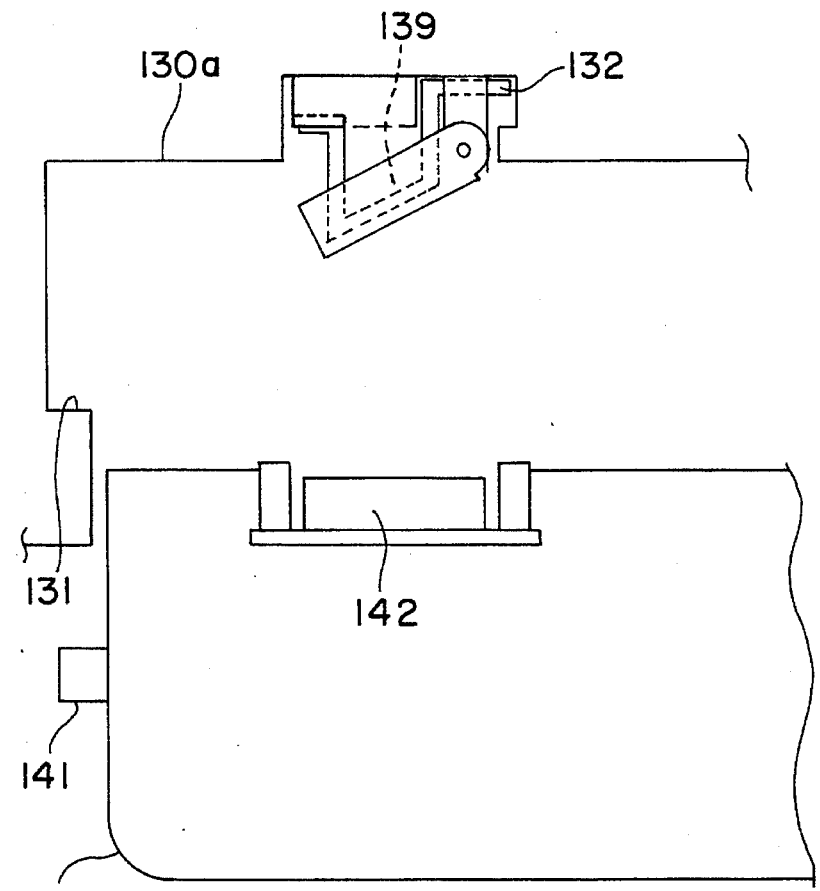
FIG. 9 is a plan view showing the relation of a male connector to a female connector when the control panel is unlocked.
Figure 10:
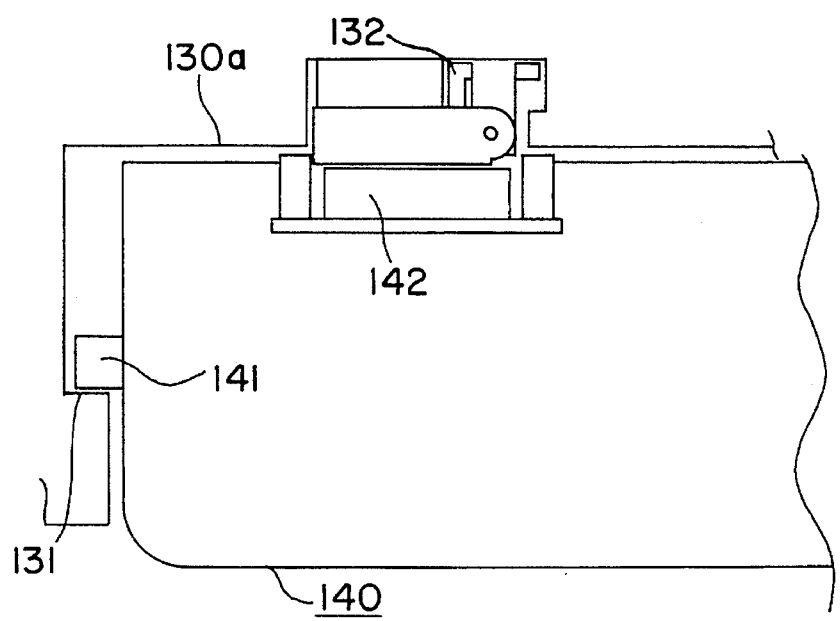
FIG. 10 is a plan view showing the connection of the male connector and the female connector when the control panel is locked.
Figure 11:
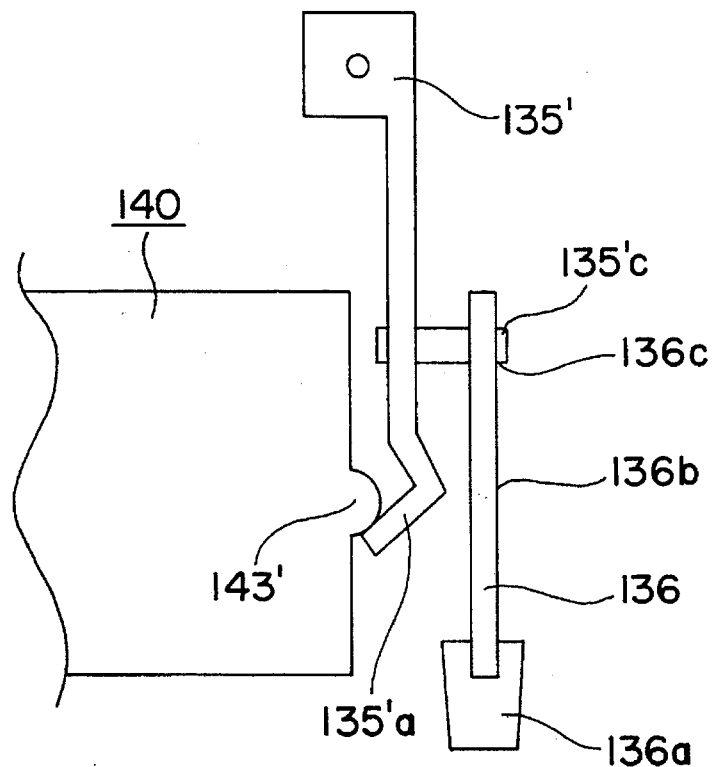
FIG. 11 is a schematic view of a modification of the first embodiment of the present invention.
Figure 12:
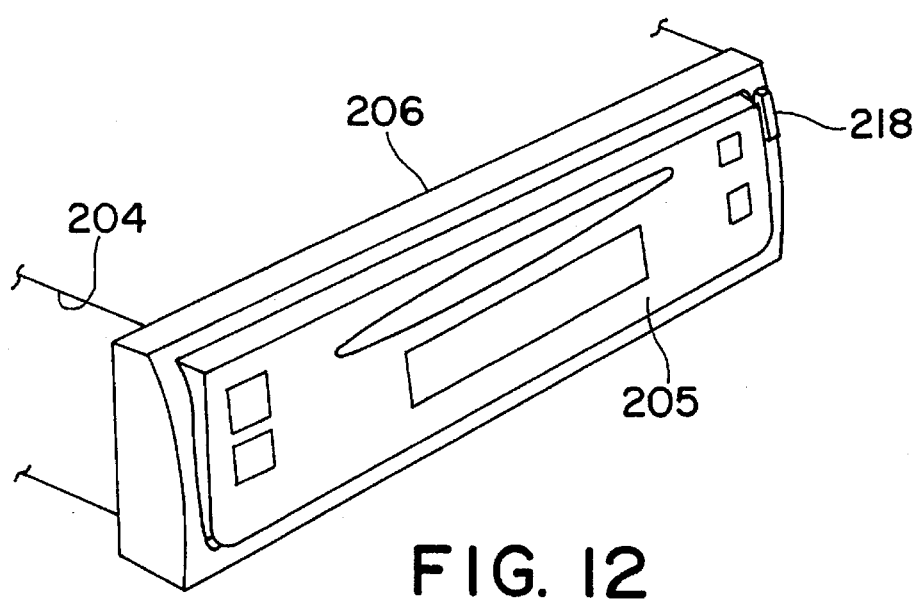
FIG. 12 is a schematic view of a second embodiment of the present invention.
Figure 13:
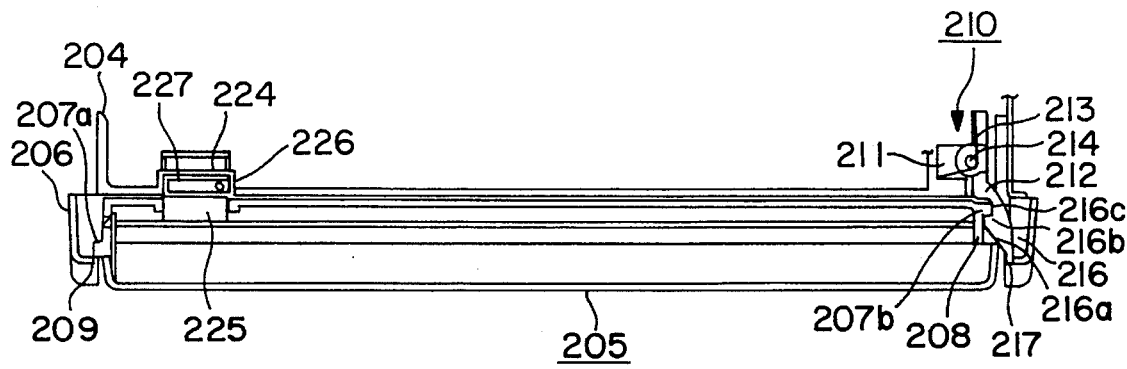
FIG. 13 is a cross section view of the second embodiment showing the control panel locked to an equipment body.
Figure 14:
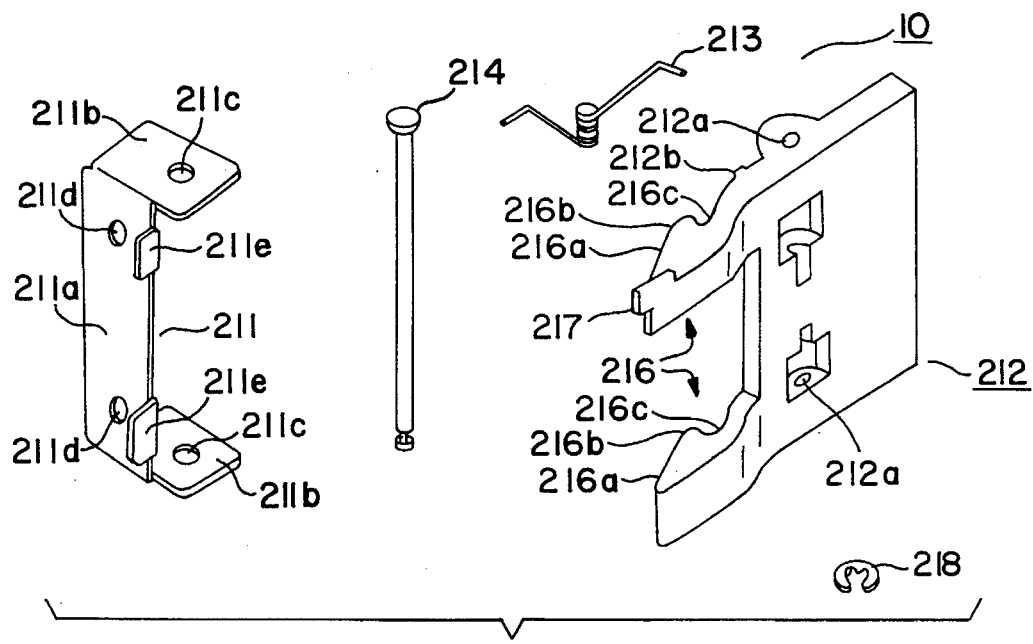
FIG. 14 is an exploded view of an unlocking mechanism of FIG. 12.
Figure 15:
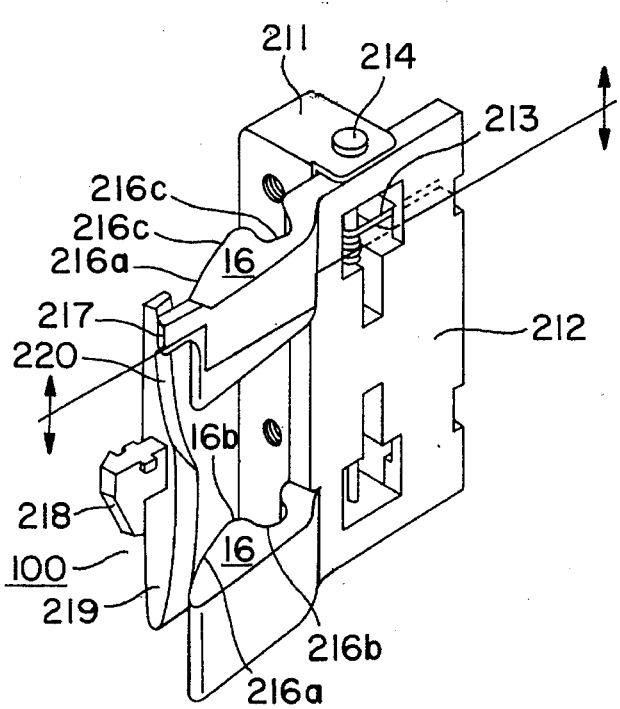
FIG. 15 is a schematic view of the unlocking mechanism of FIG. 12.
Figure 16:
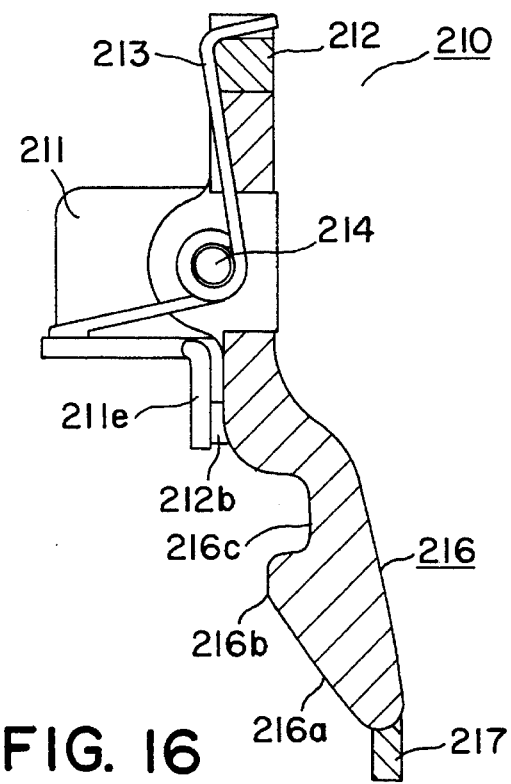
FIG. 16 is a cross sectional view of the unlocking mechanism of FIG. 12.
Figure 17:
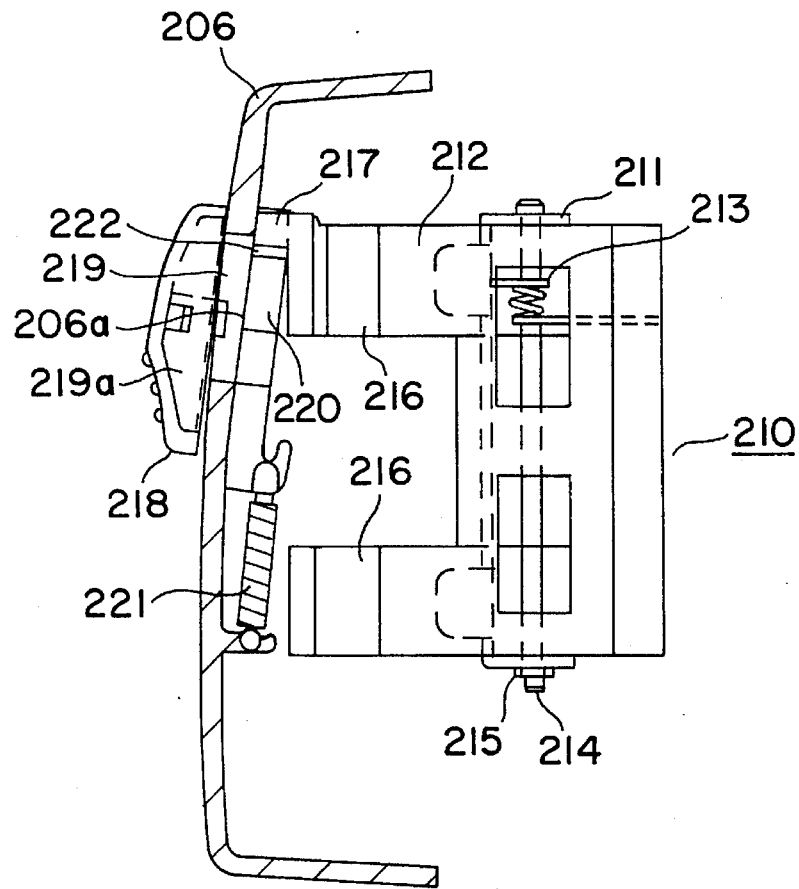
FIG. 17 is another cross sectional view of the unlocking mechanism of FIG. 12.
Figure 18:
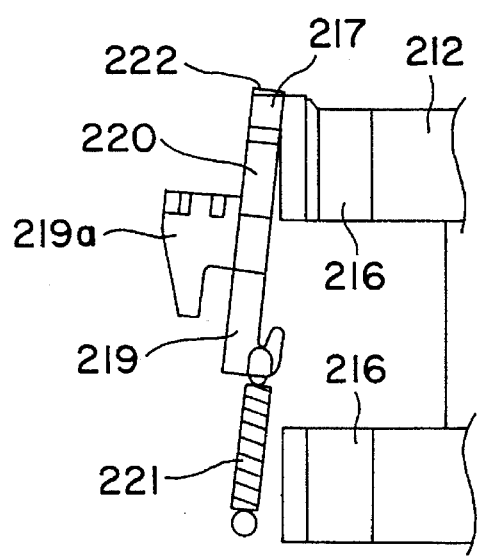
FIG. 18 is a detailed cross sectional view of the unlocking mechanism of FIG. 17.
Figure 19:
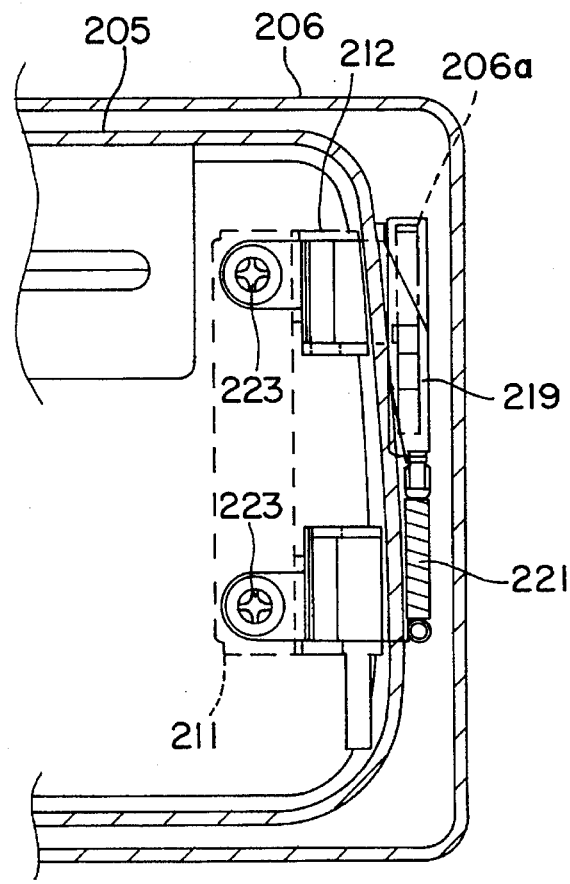
FIG. 19 is yet another cross sectional view of the unlocking mechanism of FIG. 12.
Figure 20:
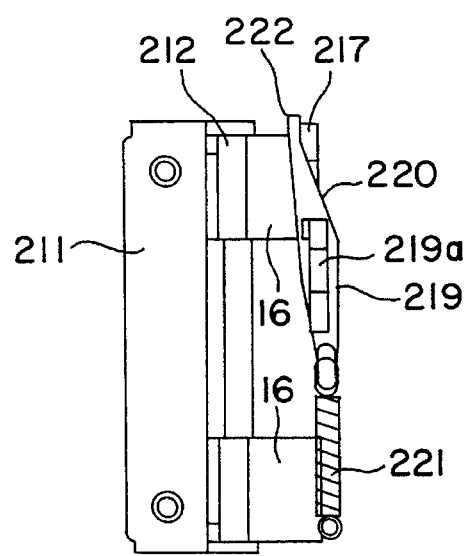
FIG. 20 is a detailed cross sectional view of the unlocking mechanism of FIG. 19.
Figure 21:
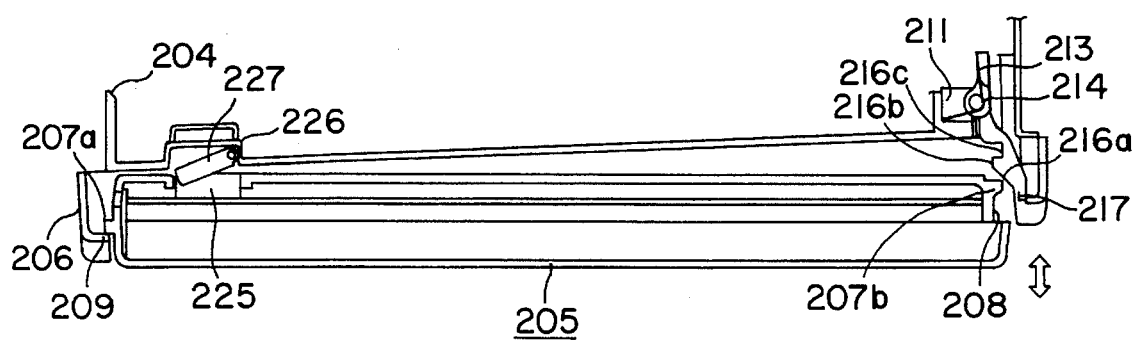
FIG. 21 is a cross sectional view of the second embodiment showing the control panel unlocked from the equipment body.
Figure 22:
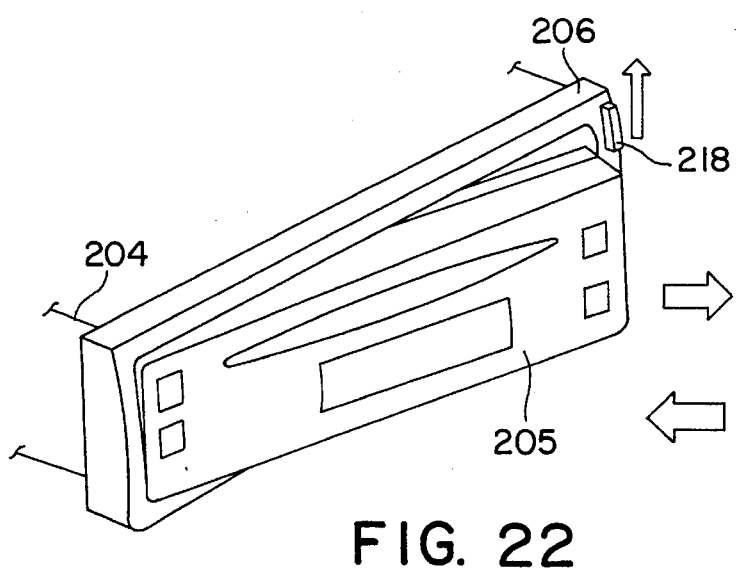
FIG. 22 is a schematic view showing the control panel during removal from the equipment body.
Figure 23:
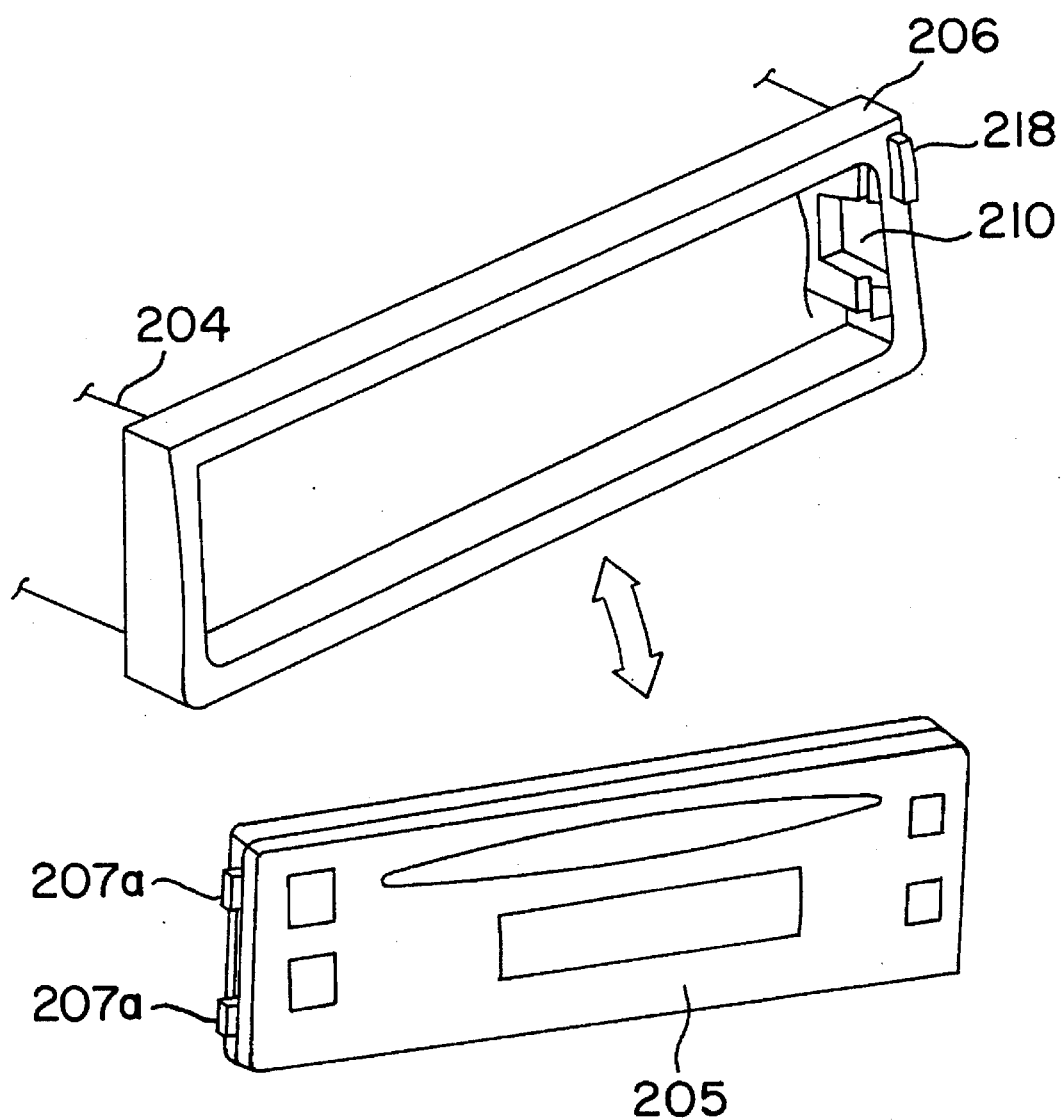
FIG. 23 is a schematic view showing the control panel removed from the equipment body.
Figure 24:
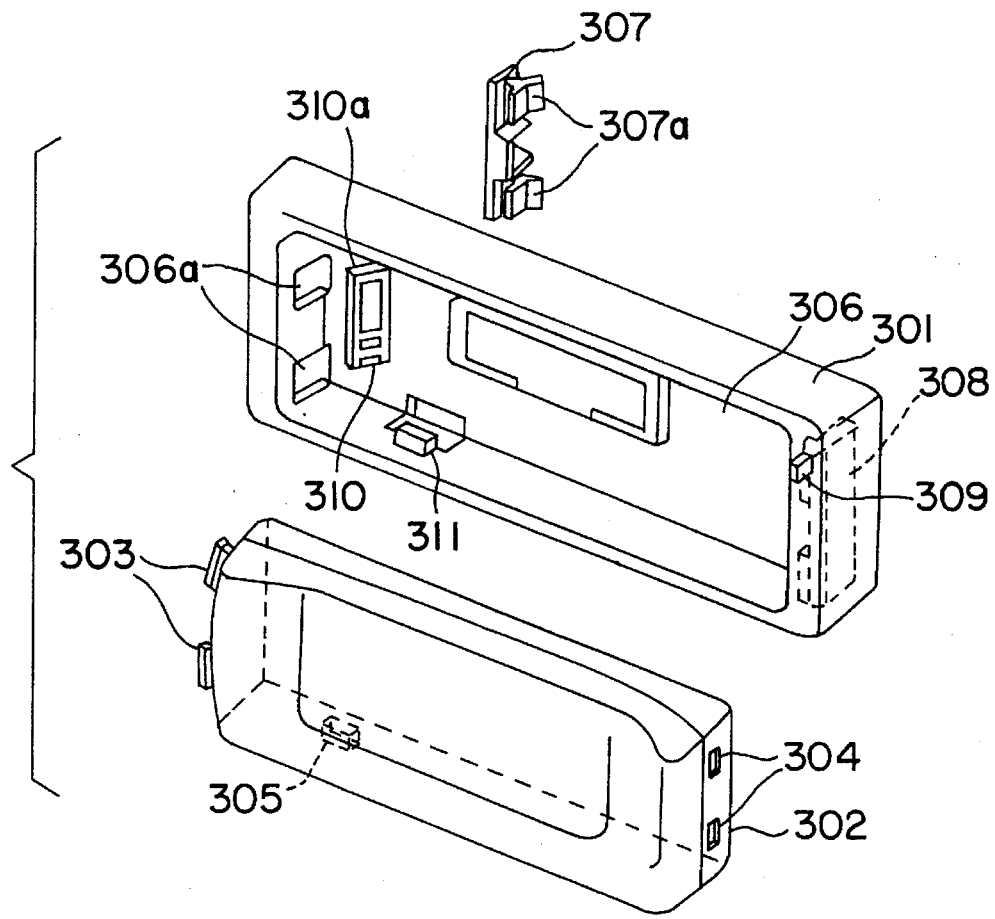
FIG. 24 is an exploded schematic view of a third embodiment of the present invention.
Figure 25:
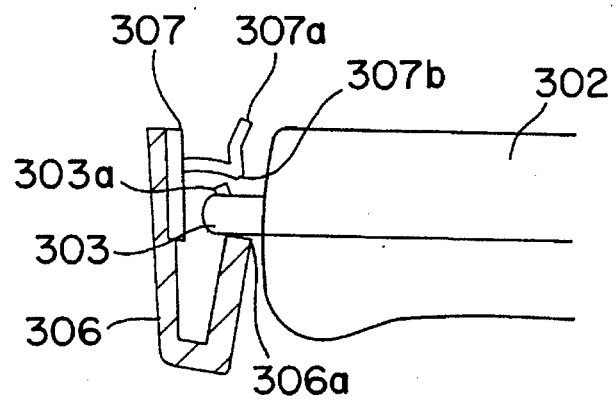
FIG. 25 is a schematic view showing the connection of a control panel and a pair of holes at a left-hand side of an equipment body of FIG. 24.
Figure 29:
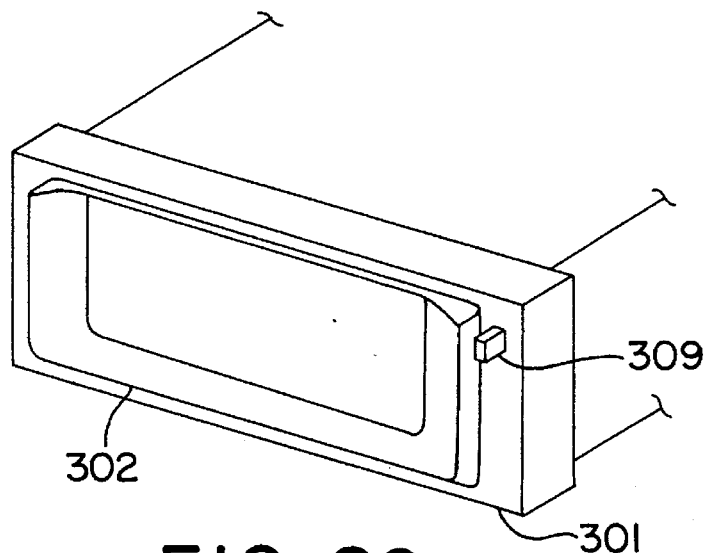
FIG. 29 is a schematic view of third embodiment of present invention.
Figure 30:
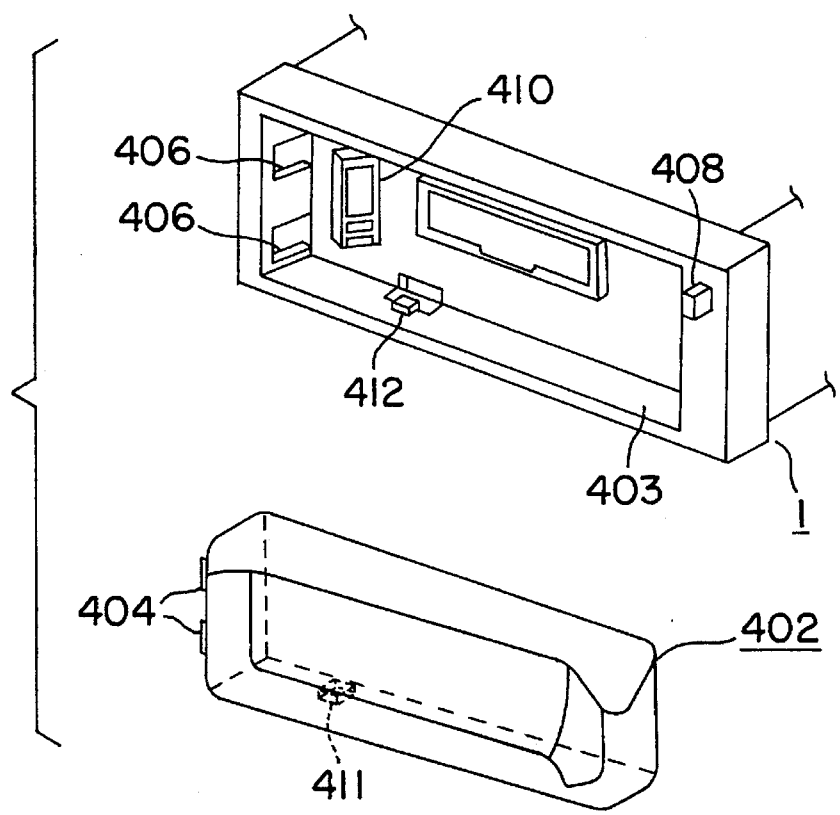
FIG. 30 is a schematic view showing a control panel and an equipment body of a fourth embodiment of the present invention.
Figure 31:
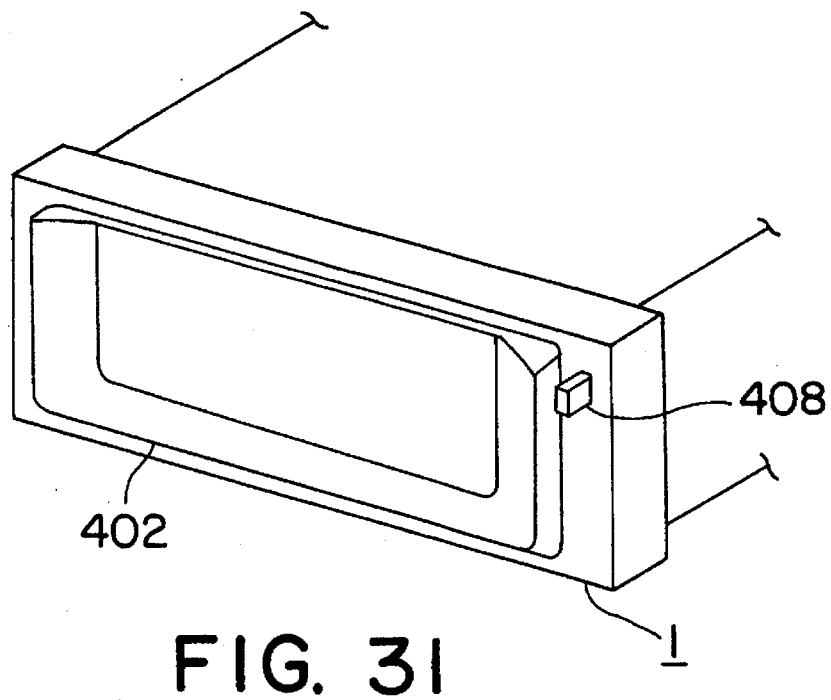
FIG. 31 is a schematic view of the fourth embodiment of FIG. 30 when a control panel is attached.
Figure 32:
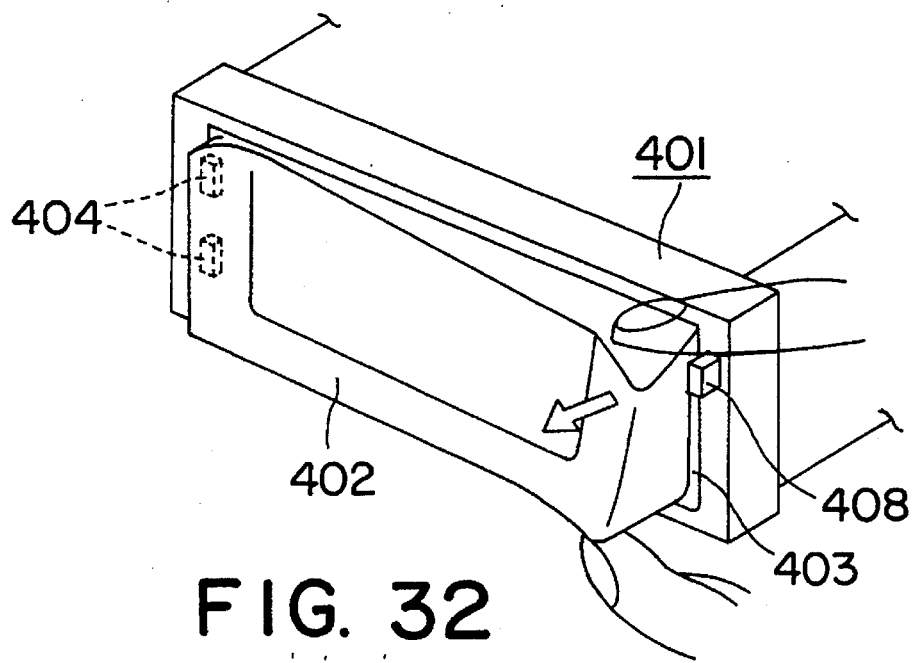
FIG. 32 is an illustration showing a user removing the control panel from the equipment body.
Figure 33:
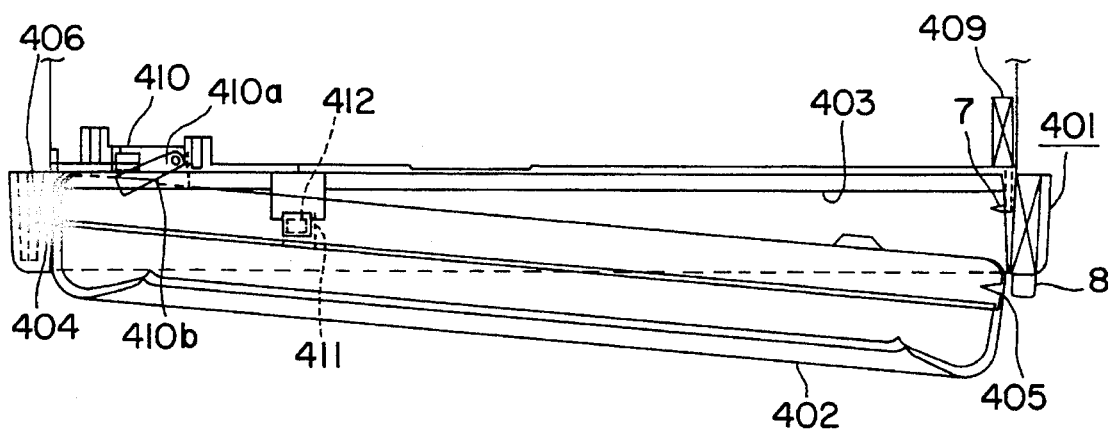
FIG. 33 is a plan view of the fourth embodiment of FIG. 30 showing the control panel retained at an appropriate position.
Figure 34:
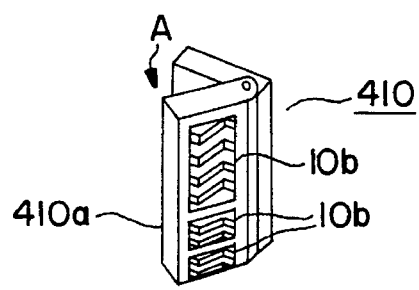
FIG. 34 an enlarged schematic view showing a socket of FIG. 30.
Figure 35:
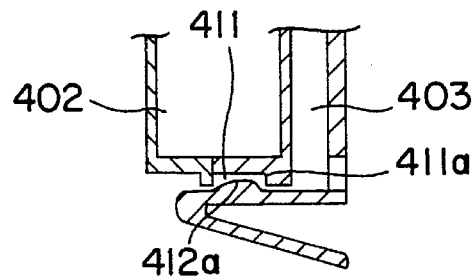
FIG. 35 is an illustration showing the connection of a male connector of the equipment body and a connecting recess of the control panel.
Figures 36A, 36B:
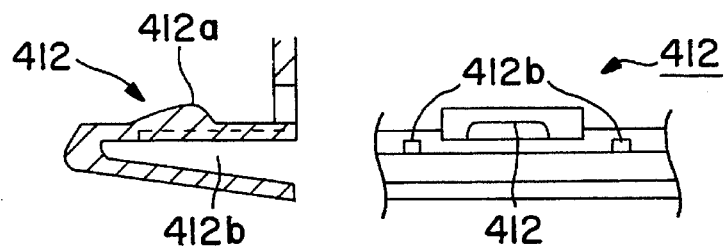
FIG. 36(a) is a cross sectional view of the male connector of FIG. 30.
FIG. 36(b) is a front view of the male connector of FIG. 30.
Figure 37:
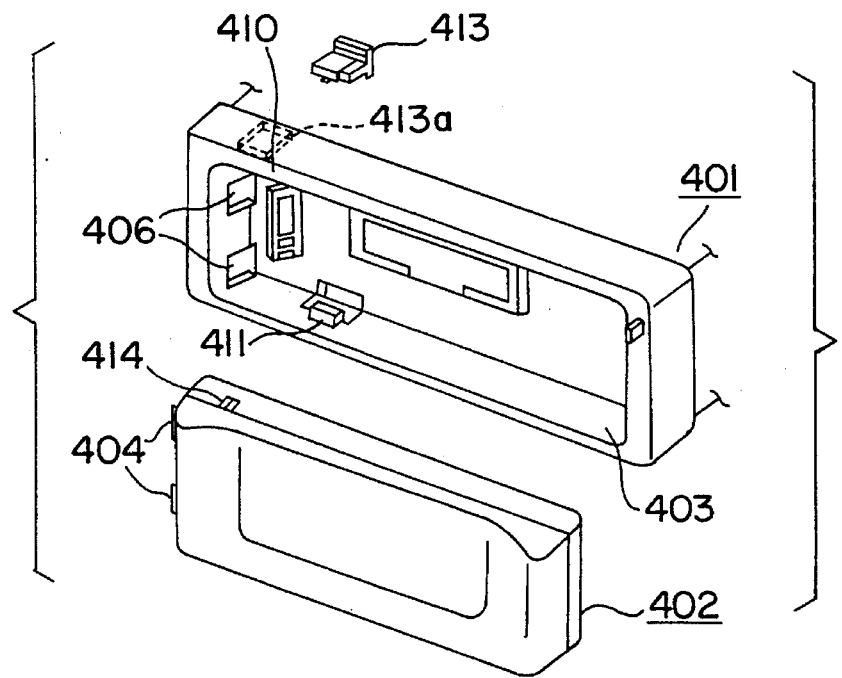
FIG. 37 is a perspective view illustrating a modification of the embodiment of FIG. 30.

Referring now to FIG. 3–5, when the user actuates the lock release mechanism, control panel 302 is unlocked and rotated a small distance by bias plate 310a. Hook 303a of protrusion 303 engages stopping portion 307a of elastic stopper 307 in frame 306, while stopper 311 is restricted within concavity 305.

The above device operates as follows. During mounting of control panel 302, protrusions 303 of control panel 302 are inserted into holes 306a of frame 306 and contact elastic stopper 307. Hooks 303a of protrusions 303 couple with front ends 307b of elastic stopper 307. Control panel 302 is urged forward by bias plate 310a of socket 310. Stopping protrusion 311a of stopper 311 extends within concavity 305, thereby forcing a bottom edge of control panel 302 upward. Distortion along recessed portions 311b reduces the friction between stopper 311 and control panel 302. Next, the rear surface of control panel 302 presses against bias plate 310a of socket 310 and forces bias plate 310a into a cavity of socket 310. Another socket (not shown) on the rear side of control panel 302 is connected electrically to socket 310. Finally, locking portions 308 engage with recesses 304 to lock control panel 302.

During a releasing operation, release button 309 is depressed to actuate the lock release mechanism, retracting locking portions 308 from recesses 304. Control panel 302 moves forward due to pressure from bias plate 310a of socket 310 and rotates upon protrusions 303 until stopper 311 reaches a limit of concavity 305. Protrusions 303, of control panel 302, move in a clockwise direction, between edges of holes 306a and stopper 307 until protrusions 303 make contact with front ends 307b of elastic stopper 307. The contact retains control panel 302 at a predetermined ejected position without external force being applied. Once in this position, a user can easily remove control panel 302.

In the present invention, protrusions 303 of control panel 302 are held by front ends 307a of elastic stopper 307, thereby preventing release of control panel 302 by vibrations. The contact between protrusions 303 and front ends 307a produces a click feel when control panel 302 is detached by the user. The click feel ensures the user of the proper operation of the mechanism. In addition, it is possible to produce the same function by the contact of protrusions 303 and front ends 307a without recess 305 and stopper 311.

Referring now to FIG. 4-1, another embodiment of the present invention is shown. An equipment body 401 is mounted inside a car and a control panel 402 is removably attached to equipment body 401 by protrusions 404 and concavity 411. Equipment body 401 has holes 406 in a left side of a frame 403, a release button 408 at a right side, and a stopper 412 at a lower edge of frame 403. A locking mechanism, having a pair of locking protrusions (not shown), is fixed within the right side of frame 403 by a means for affixing (not shown). In FIG. 4-2 control panel 402 is shown lock into position within equipment body 401. FIG. 4-3 shows removal of control panel 402 by a user after release button 408 has been depressed.

Referring to FIG. 4—4, depression of release button 408 actuates a lock release mechanism (not shown) mounted inside equipment body 401. The lock release mechanism retracts locking protrusions 407 from recesses 405. A socket 410, disposed inside of frame 403, electrically connects control panel 402 to equipment body 41.

Referring now to FIG. 4–5, socket 4–10 includes an bias plate 410a and a connector portion 410b. Bias plate 410a is rotatably attached to equipment body 401 and is biased forward. Bias plate 410a is pressed backward, by a rear surface of control panel 402 during mounting, into a recess of socket 410 in equipment body 41.

Referring now to FIGS. 4–6, 4–7a and 4–7b, stopper 412 engages concavity 411. Stopper 412 includes a stopping protrusion 412a and recessed portions 412b. Stopping protrusion 412a is coupled to concavity 411 when control panel 402 is rotated outward upon protrusions 404 of control panel 402 during removal. When control panel 402 is completely mounted in equipment body 401, stopping protrusion 412a passes over concavity 411.

Referring again to FIGS. 4-2, 4-3 and 4—4, the above device operates as follows. During mounting of control panel 402, protrusions 404 of control panel 402 are inserted into holes 406 of frame 403. Control panel 402 is rotated against the force of bias plate 410a of socket 410. Stopping protrusion 412a of stopper 412 passes over a forward edge 411a of concavity 411 while stopper 412 is forced downward. Distortion along recessed portions 412b allows movement of stopper 412. Next, the rear surface of control panel 402 presses bias plate 410a into a recess of socket 410 in equipment body 41. Another socket, (not shown) on a rear surface of control panel 402, connects electrically to socket 410. Finally, holes at the right side of control panel 402 reaches the locking portions of equipment body 401 to lock control panel 402.

During a removal operation, release button 408 is depressed to unlock control panel 402. Release button 408 actuates the lock release mechanism, thereby retracting locking portions in the right side from holes 405 in control panel 402. Control panel 402 moves forward under pressure from bias plate 410a of socket 410 and rotates upon protrusions 404 until stopper 412 engages concavity 411. The engagement retains control panel 402 an ejected position so that a user may manually remove control panel 402. Since control panel 402 is retained at the ejected position during removal, it is possible for the user to easily grasp control panel 402.

Referring to FIG. 4–8, a modification of the above embodiment includes a stopper 413 and a recess 414. Stopper 413 is disposed at the left upper side inside frame 403. Recess 414 is disposed at a left upper side on control panel 402. When control panel 402 is unlocked and located at an ejected position by bias plate 410a of socket 410, stopper 413 is coupled with recess 414. The coupling retains control panel 402 at the ejected position. Other structures are the same as the fourth embodiment.

During mounting of control panel 402, protrusions 404 of control panel 402 are inserted into holes 406 of frame 403. The user rotates control panel 402 which is hinged by protrusions 404. Stopper 4 13 passes over recess 414 and stopping protrusion 412a of stopper 412 passes over concavity 411. Operation then proceeds as described in the above embodiment.

During removal of control panel 402, the operation is similar to that above except as stated below. Control panel 402 is forced forward by bias plate 410a until stopper 412 and stopper 413 are connected to concavity 411 and recess 414, respectively. The two connections retain control panel 402 at the ejected position until a user removes control panel 402.

In the present invention, the control panel 402 is retained by the two connections after unlocking, thereby preventing accidental release of control panel 402. Furthermore, the two connections produce a click feel when the user removes control panel 402 thus reducing user error during removal of control panel 402.

The present invention is not limited to the above-mentioned respective embodiments. For example, the present invention is generally applicable to vehicle-mounted electronic equipment such as cassette players, radio sets, or complex devices which include a combinations of the above in addition to CD players.

The respective specified structures of the engaging means and the locking means in the present invention may be modified when required, especially the specified shapes of the engaging and locking means wherein convexities and concavities may be selected as required.

In addition, those skilled in the art can provide various changes and modifications based upon the spirit and features of the present invention. All such changes and modifications are considered within the scope of the present invention defined in the appended claims.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. An anti-theft mechanism in a vehicle-mounted electronic apparatus comprising:

an equipment body;

a control panel;

said control panel including means for operating said electronic apparatus;

said equipment body including a first engaging portion;

said control panel including a second engaging portion;

said first engaging portion has one of a convex shape and a concave shape;

said second engaging portion has another one of a convex shape and a concave shape;

said first engaging portion engaging said second engaging portion;

said equipment body including a first locking portion;

said control panel including a second locking portion;

said first locking portion having one of a convex shape and a concave shape;

said second locking portion having another one of a convex shape and a concave shape;

said first locking portion interlocking with said second locking portion;

a release means for disengaging said first locking portion from said second locking portion;

biasing means for biasing said control panel away from said equipment body;

retaining means for retaining said control panel at an ejected position after operation of said release means;

said retaining means including a first stopper and a second stopper;

said equipment body including said first stopper;

said control panel including said second stopper; and said first stopper and said second stopper being capable of contacting each other.

2. An anti-theft mechanism in a vehicle-mounted electronic apparatus comprising:

an equipment body;

a control panel;

a frame;

said equipment body including said frame;

said control panel including means for operating said electronic apparatus;

said frame including a first engaging portion;

said control panel including a second engaging portion;

said first engaging portion has one of a convex shape and a concave shape;

said second engaging portion has another one of a convex shape and a concave shape;

said first engaging portion engaging said second engaging portion;

said frame including a first locking portion;

said control panel including a second locking portion;

said first locking portion having one of a convex shape and a concave shape;

said second locking portion having another one of a convex shape and a concave shape;

said first locking portion interlocking with said second locking portion;

a release means for disengaging said first locking portion from said second locking portion; and biasing means for biasing said control panel away from said equipment body.

3. An apparatus according to claim 2, wherein said release means moves a tapered member shifting said first locking portion so as to disengage said first locking portion from said second locking portion.

4. An anti-theft mechanism for an electronic apparatus mounted in a vehicle comprising:

an equipment body of said electronic apparatus, said equipment body being mounted within said vehicle;

a control panel;

engaging means for removably coupling said control panel to said equipment body;

locking means for locking said control panel in a mounted position upon said equipment body, said locking means including a release means for unlocking;

biasing means for biasing said control panel away from said equipment body; and retaining means for holding said control panel in an ejected position after actuation of said release means; and wherein said retaining means has a first retaining portion included in said equipment body;

said retaining means has a second retaining portion included in said equipment body;

said first retaining portion and said second retaining portions cooperate such that said control panel is retained at said ejected position;

said biasing means moves said control panel from said mounted position to said ejected position after said release means is actuated; and said retaining means is deflectable such that a click feel effect upon mounting and removal of said control panel.

* * * * *

UNITED STATES PATENT AND TRADEMARK OFFICE
CERTIFICATE OF CORRECTION

PATENT NO. : 5,575,544
DATED     : November 19, 1996
INVENTOR(S) : Masakazu Hasegawa et al.

It is certified that error appears in the above-indentified patent and that said Letters Patent is hereby corrected as shown below:

<u>TITLE PAGE</u>

Item [30] Foreign Application Priority Data:

Change "Feb. 26, 1993  [JP]  Japan ....... 5-038931 U"
to --Feb. 26, 1993  [JP]  Japan ....... 5-038931--

Signed and Sealed this

Eighteenth Day of March, 1997

Attest:

BRUCE LEHMAN

*Attesting Officer*          Commissioner of Patents and Trademarks